United States Patent

Warren et al.

[11] Patent Number: 5,248,128
[45] Date of Patent: Sep. 28, 1993

[54] REMOTE END DETECTION

[75] Inventors: John A. Warren, Saxmundham; Mark R. J. Wills, Ipswich; Robert A. Freeman, Ipswich; Peter D. Baxter, Ipswich, all of England

[73] Assignee: British Telecommunications public limited company, London, England

[21] Appl. No.: 836,276

[22] PCT Filed: Sep. 4, 1990

[86] PCT No.: PCT/GB90/01366
§ 371 Date: Mar. 2, 1992
§ 102(e) Date: Mar. 2, 1992

[87] PCT Pub. No.: WO91/03756
PCT Pub. Date: Mar. 21, 1991

[30] Foreign Application Priority Data
Sep. 4, 1989 [GB] United Kingdom ............... 8919934

[51] Int. Cl.⁵ ............................................ B65H 59/00
[52] U.S. Cl. ............................................... 254/134.4
[58] Field of Search ................... 250/227.14, 227.2; 254/134.3 FT, 134.3 R, 134.4; 15/104.05, 104.3 R

[56] References Cited

U.S. PATENT DOCUMENTS

| 4,340,302 | 7/1982 | Oku | 250/227.2 |
| 4,402,790 | 9/1983 | Lynn et al. | 250/227.14 |
| 4,573,829 | 3/1986 | Keene et al. | 254/134.3 FT |
| 4,644,791 | 2/1987 | Sonoda et al. | 254/134.3 FT |
| 4,856,760 | 8/1989 | Frost et al. | 254/134.4 |
| 4,856,937 | 8/1989 | Grocott et al. | 254/134.4 |
| 5,090,665 | 2/1992 | Walters et al. | 254/134.4 |

FOREIGN PATENT DOCUMENTS 3413667 10/1985 Fed. Rep. of Germany.
1525000 9/1978 United Kingdom.

OTHER PUBLICATIONS

The Transactions of The Iece of Japan, vol. 64, No. 6, Jun. 1981, M. Tokida: "A new multipurpose fiber optic sensor" p. 433.

Primary Examiner—Robert C. Watson
Attorney, Agent, or Firm—Nixon & Vanderhye

[57] ABSTRACT

An apparatus and method for determining passage along an installation route of an advancing end of an optical fibre. A detector at the installation end detects when light is transmitted back along the fibre from a source at a predetermined location. The source may be a primary source or comprise a means for coupling to a light carrying fibre.

25 Claims, 3 Drawing Sheets

REMOTE END DETECTION

This invention relates to the installation of optical fibres.

A standard requirement for the installation of an optical fibre, or bundle of fibres, is that it should be fed into a protective tube or duct which follows the route along which the fibre is to be laid. An optical fibre is delicate and excessive tension induced in it at any stage will impair its operating performance, therefore it is preferred to install optical fibres in ducts by the technique of fibre blowing which utilises viscous drag of a fluid. The fluid, usually compressed gas is blown along the tube and the optical fibre package is urged along by a force distributed over the fibre length. To aid installation the fibre, or a bundle of fibres, may be provided with a lightweight coating such as a foamed plastics material.

The basic fibre blowing method is the subject of our U.S. Pat. Nos. 4,691,896 and 4,948,097, which are herein incorporated by this reference. Developments of the fibre blowing method are described in the following European patent applications: 0287225, 0296860, 0345043, 90303168.0, 88311112.2, 88311113.0, 89304003.0. For the avoidance of doubt, the present invention may be used with any of the fibre blowing variants described or claimed in any of the aforementioned patents or applications.

Such installation methods may be used to install considerable lengths of fibre, so that the point of entry of the fibre into the duct is distant from the point of exit of the fibre at the far end of the duct. It would be of considerable assistance in fibre blowing and other installation processes which involve "pushing" fibres into ducts to have some means at the installation or entry point end of the fibre of knowing when the fibre successfully reaches the far end of the duct and the route is thus completed. This can be done by measuring the length of fibre paid out into the duct if the duct length is known, but this may not always be the case, especially for reinstallation or additional installation, and requires more documentation and information recordal.

The present invention is directed towards providing an installation completion indication that utilises a fibre unit being blown into a tube as a transmission medium to indicate whether or not the unit has completed a given route through the tube.

Accordingly the invention provides a method of determining passage along an installation route of an advancing end of an optical fibre, the method comprising introducing light into the advancing end at a predetermined location on the installation route and monitoring the fibre being installed along the route to detect transmission of the introduced light along the fibre.

The invention also provides apparatus for determining passage along an installation route of an advancing end of an optical fibre, the apparatus comprising means for introducing light into the advancing end of the fibre as it reaches proximity to a predetermined location and means for detecting the introduced light returning along the optical fibre.

The invention will now be described by way of example with reference to the accompanying drawings in which:

FIG. 3 illustrates schematically a variant of the first embodiment of the invention, in which light sources are placed at intermediate points along a route;

Figure 1:
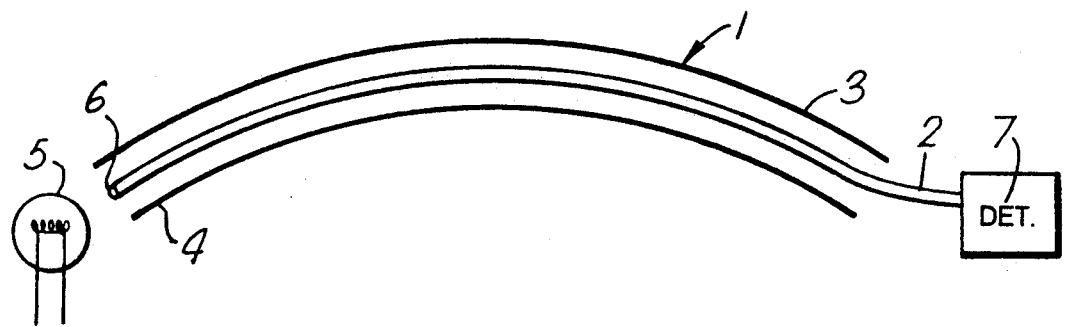
FIG. 1 illustrates schematically one embodiment of the invention.

The embodiment illustrated in FIG. 1 shows a tube 1 through which a fibre unit 2 is being installed, for example by the fibre blowing technique. The fibre unit 2 for example may be a single fibre or a bundle of fibres that may include electrical wires. The fibre unit is installed from end 3 of the tube and is blown through the tube to emerge at the opposite, remote, end 4. A light source 5 is placed at the remote end 4 of the tube. The fibre unit has at its distal end a transparent bead or lens 6 which focuses light from the light source 5 into the fibre unit, and at least one fibre in the unit being blown is monitored by a detector 7 at the installation end 3 which detects optical power in that fibre. When the distal end emerges from the tube at the light source there is an increase in the light transmitted along the fibre to the detector, thus indicating that the fibre unit has reached the far end of the tube, and that the route installation is completed. It will be realised that as the fibre unit is being installed some light from the source may travel into a straight portion at the end of the duct so that the marked increase in optical power transmitted along the fibre at the time of emergence may be preceded by a lower intensity transmission as the fibre nears the end and becomes within line of sight of the light source, and in some instances this earlier detection may be useful.

In order to avoid false detections of ends, which might occur if all or part of the duct into which the fibre was being blown were translucent or transparent to radiation of a wavelength used for end point detection, it is preferable to impose some characteristic modulation onto the light from source 5. Moreover, where the optical detector 7 is sensitive to visible light or other wavelengths likely to be emitted from electrical sources of ambient light, such as incandescent or fluorescent light bulbs or tubes, the characteristic modulation should have a frequency distinct from that of the local electricity supply or harmonics thereof. Within the United Kingdom, where the domestic electricity supply is nominally at 50 Hz, we have used a characteristic modulation in both the FIG. 1 and FIG. 2 embodiments of 270 Hz. Where intermediate point as well as end point detection is to be used, similar care should be exercised in selecting each modulation frequency.

Even where the ducting is opaque, the use of a characteristic modulation distinct from any likely to be generated by ambient lighting is preferable, since it is not always easy to ensure complete screening of the detector 7.

Clearly, for optimum sensitivity, one is well advised to use a light source 5 which operates at a wavelength suitable for the fibres being installed. For silica fibres, wavelengths around 0.85 $\mu$m, 1.3 $\mu$m or 1.55 $\mu$m are preferred. The use of the 0.85 $\mu$m region has the advantage that both sources and detectors are available at low cost. Where appropriate, even visible light or other shorter wavelengths may be used.

Preferably, the equipment at the 'home' end includes a test function whereby, before commencing installation, light of the appropriate characteristics can be shone on the relevant fibre end, with the equipment giving an indication, such as the illumination of an LED display, that the detector 7 has received the test light. The test light may have a different characteristic, preferably a different modulation characteristic, to that of the end—or intermediate—point indicating light. This precaution further reduces the likelihood of unintentional triggering of the end/intermediate point detection.

It is also possible to have distance marker light sources, possibly at different wavelengths or modulations, at intermediate route locations which may be particularly useful in conjunction with multi stage air input blowing or other boosting techniques. The light detection may then become part of the control system for example for boosting air into or venting air from the ducts, in addition to detecting route completion.

Figure 2:
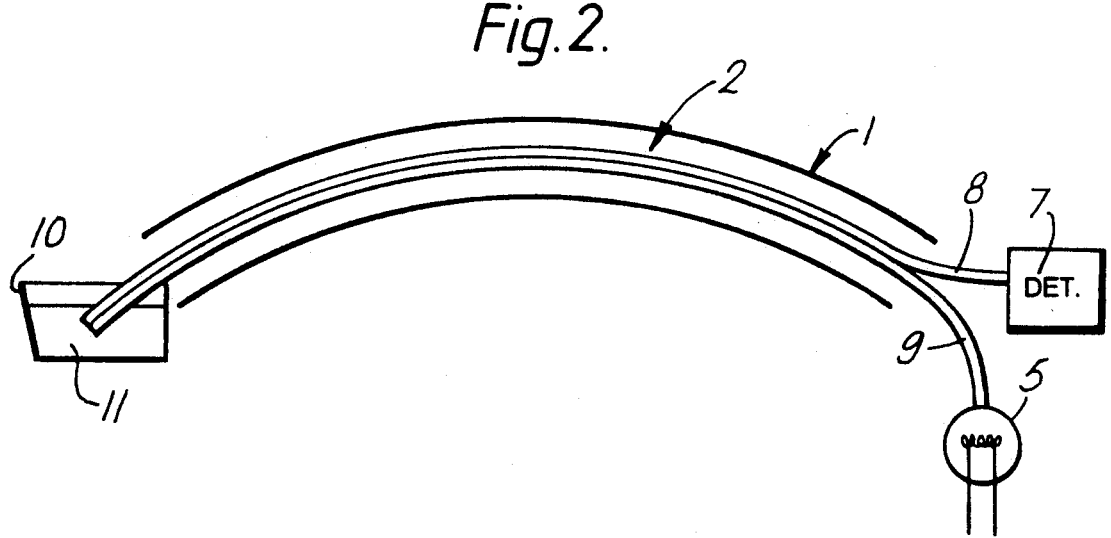

FIG. 2 shows a tube 1 through which a fibre unit 2 comprising at least two fibres 8 and 9 is blown. In this embodiment one fibre 8 is monitored by detector 7 at the installation end 2 which detects optical power in that fibre. A second fibre 9 is coupled at the installation end to a light source 5. During installation, while the fibres are being blown through the tube, the two fibres 8 and 9 remain uncoupled, so that light from light source 5 cannot pass from fibre 9 to fibre 8 and there is substantially no light detected by detector 7. At the distal end of the tube 1, there is a receptacle 10 containing a fluid or gel, preferably index matched to the refractive index of the fibres, or a similar substance.

On completion of the route, when the fibre unit emerges from the distal end of the tube, it is constrained to plunge or dip into the fluid 11 in receptacle 10, and the fluid which is of lower or matching refractive index will allow the fibres to couple. The light from light source 5, having been transmitted along fibre 9 to the gel, then passes back into fibre 8 and is transmitted to detector 7. The detector at the installation end registers an increase in optical power, indicating that the fibre unit has reached the far end of the tube, and that the route is completed.

This fibre coupling technique may be used alone or in combination with the technique of intermediate light sources described with reference to FIG. 1. The two fibres 8 and 9 may be independent, as shown in FIG. 2, or part of a single bundle.

Figure 3:
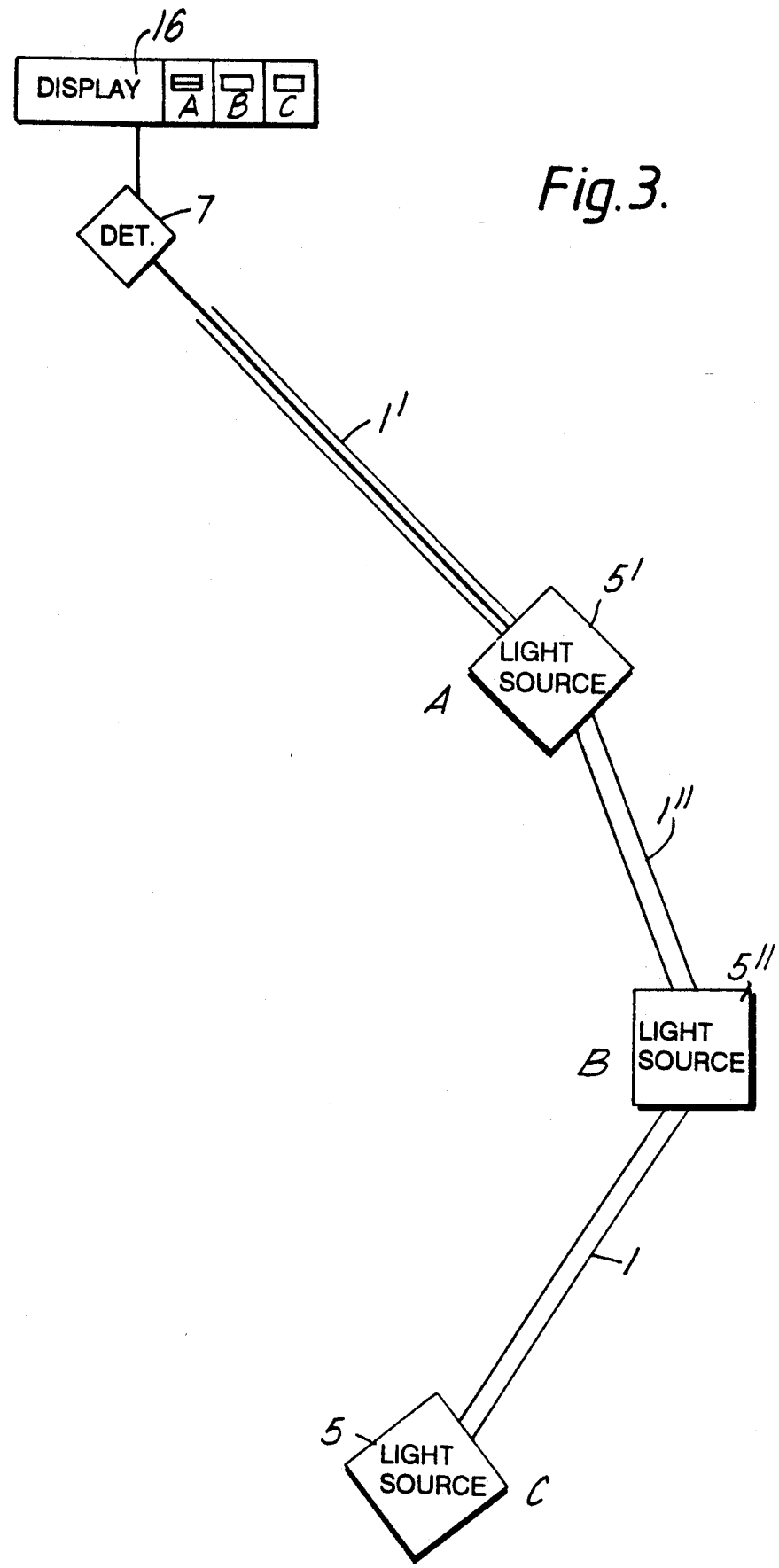
FIG. 3 illustrates schematically a second embodiment of the invention.

FIG. 3 illustrates schematically the use of several light sources 5, 5' and 5" to identify several locations A, B and C along an installation route. Typically, the different locations might be different floors or points within a building, or different buildings on a campus-like site. As mentioned previously, the different light sources provide distinguishable signals, whereby the identity of the relevant light source can be determined remotely. Conveniently, the light sources at the different locations each have different modulation rates. Display means 16 are provided to indicate when the fibre reaches each node.

Figure 4:
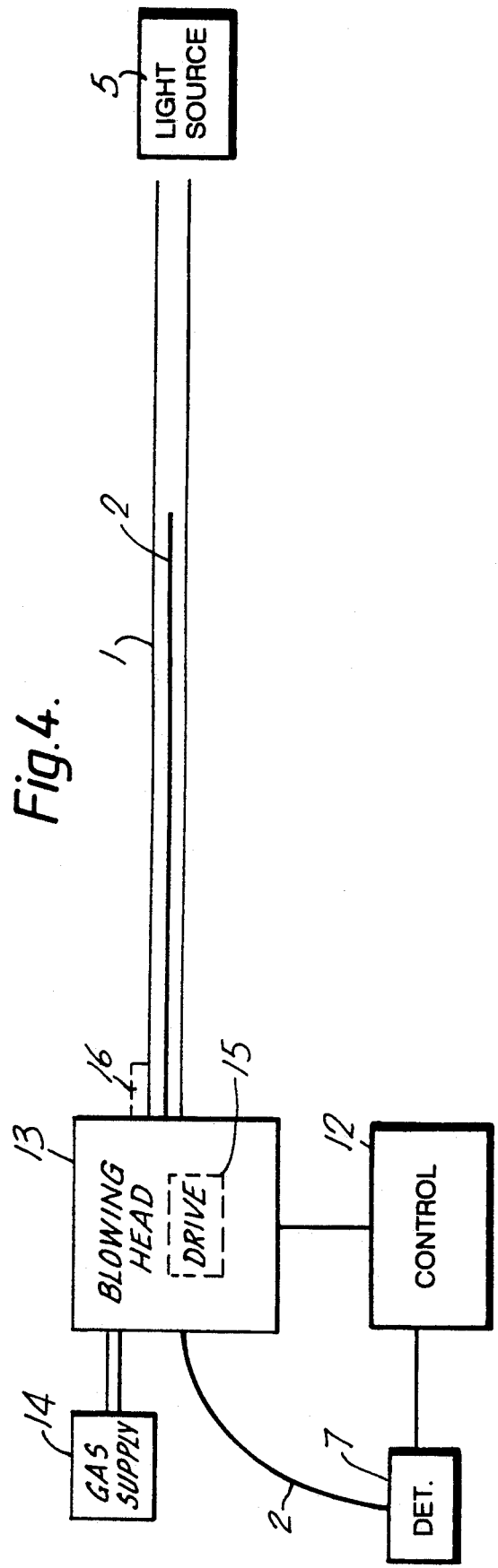
FIG. 4 illustrates schematically the interconnection of the remote end detection means with fibre blowing apparatus.

FIG. 4 shows, schematically, the interconnection of an installation detector according to the invention with a fibre-blowing system. The optical detector 7 of the installation detector is connected via control means 12, to the blowing head 13 of the fibre blowing system. Depending on the type of blowing head used, it may be necessary to shut off a gas supply 14, a mechanical drive means 15, and/or apply a fibre-brake 16 of some sort. In general, therefore, stopping fibre advance once the detector 7 has detected the presence of light from source 5 will require the control means 12 to control solenoids and/or other switching means. Since the precise details depend upon the control requirements of the individual blowing head, it is not practical to set out exactly how the control means should be connected. Moreover, those skilled in the art will readily perceive what is required to apply this aspect of the present invention to any fibre blowing system which they come across.

However, it is worth mentioning that a remote-end detector according to the present invention may conveniently be configured as a stand alone unit, with a plurality of switched outputs for connection to the solenoids and other controls of different blowing heads.

Where, as in the case of the fibre blowing systems detailed in European patent applications 88311112.2 and 90303168.0, the near fibre end to which the detector 7 must be coupled is in a sealed container, the detector may be connected to the control electronics 12 by means of an inductive or radio link, the detector 7, a transmitter and, where necessary, a power supply being located within the pressurised container. As an alternative to providing a power supply within the pressurised container, it is possible to use inductive coupling from an external power supply to power the detector circuit.

Less preferably, the near fibre end may be fed out of the pressurised container, so that detector 7 may be accessed directly. It may also be possible as an alternative to provide a route for wire or other mechanical links with the detector 7 located in the pressurised container, so that the detector circuit may be located outside the pressurised container.

Where such pressurised container blowing systems are used, the control means 12 may usefully control a fibre blowing brake of the type described in European patent application 363131.

In all cases, the detector 7 is coupled to the optical fibre 2 by any convenient method. While it is not essential to form an accurately cleaved end on the near end of the fibre, the use of such an end has advantages. Typically the detector 7 will be a PIN photodiode, but could be an APD or even a phototransistor.

Figure 5:
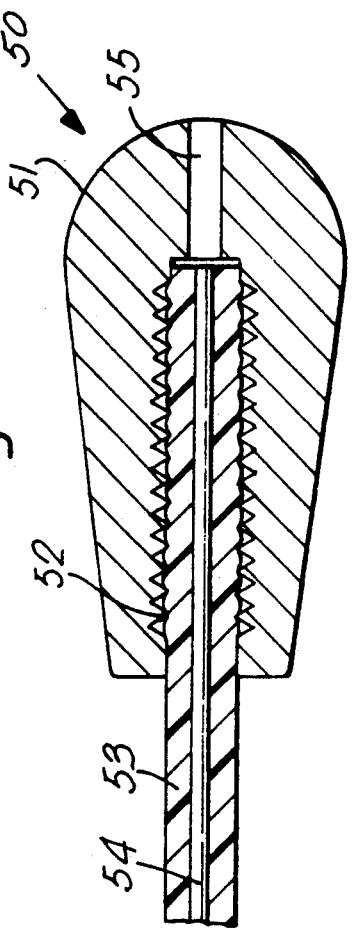
FIG. 5 illustrates an example of a bead lens suitable for use in the invention.

FIG. 5 shows an example of a bead lens 50 which has been found to be particularly suitable for use in the present invention. The bead, which is made of a plastics material, such as polymethyl methacrylate, which has a suitable refractive index and other optical properties, is of circular cross-section with a substantially hemispherical end 51. At the opposite end an axial bore-hole 52 is formed to receive an optical fibre unit 53—that is an optical fibre 54 with a relatively bulky but light-weight coating (which might be foamed polyethylene of foamed ethyl vinyl acetate). Typically such a unit carrying a single optical fibre, whether single- or multi-mode, would have an external diameter of between 1.5 and 2 mm. The bore-hole 52 extends into the body of the lens to bring the end face of the fibre unit into position to receive light 'gathered' by the main lens portion 51 of the lens.

A second and smaller bore, 55, co-axial with the first, is formed in the hemi-spherical end 51. The presence of such a bore has been found to improve the coupling efficiency of the simple lenses which we have used. For fibre units having external diameters in the range of about 1.5 to 2 mm, we have used lenses having an overall length of about 5 mm, and a diameter of about 2.7 mm. With such lenses and fibre units, the diameter of the second bore, 55, has been optimised at about 0.5 mm. For single-buffered fibres, smaller bore diameters would be used.

In the example shown, the bead-lens is elongate with a long tapered body. A spherical or more nearly spherical bead lens could of course be used, but a long body, such as that shown in FIG. 5, provides plenty of scope for attachment to the fibre/fibre bundle. The bore 52 of the bead-lens may be threaded, as shown, or provided with other forms of teeth to grip the bundle. Where a single-buffered fibre (that is a fibre which does not have a bulky outer sheath) is being installed, something else, in addition to or in place of the teeth, is needed to secure the lens to the fibre. Typically a U.V. curable or heat curable adhesive, such as an epoxy resin, will be suitable for securing lenses to such fibres. Even where a fibre or fibre bundle does have a bulky coating into which lens teeth could bite, it may be preferred to use a U.V. curable epoxy or the like in addition to or in place of the teeth.

Typically no special preparation of the fibre end is required prior to attaching the bead-lens. It is, for example, normally quite satisfactory merely to cut the fibre with a pair of pliers or side-cutters, there is normally no need to cleave the fibre ends accurately.

We claim:

1. A method of determining when an advancing end of a blown optical fibre reaches a predetermined location along an installation route, the method comprising:
   blowing an optical fibre along a conduit and introducing light into the advancing end at a predetermined location on the installation route; and
   monitoring the fibre being installed along the route to detect transmission of the introduced light along the fibre.

2. A method according to claim 1 wherein the light is introduced from an optical source located at an end of the route remote from the installation end.

3. A method according to claim 1 wherein the light is introduced at a location intermediate the ends of the route.

4. A method according to claim 1 in which the light is introduced by permitting the advancing end to dip into a container of fluid of lesser or matched refractive index than the fibre, the fluid being coupled to an optical source.

5. A method according to claim 4 in which the fluid is coupled to an optical source via a fibre also advanced along the route and arranged to dip into the fluid.

6. A method according to claim 1 wherein the advancing end of the fibre is provided with a lens.

7. Apparatus for determining when an advancing end of a blown optical fibre reaches a predetermined location along an installation route, the apparatus comprising:
   means for blowing an optical fibre along a conduit and introducing light into the advancing end of the fibre as it reaches proximity to a predetermined location; and
   means for detecting the introduced light returning along the fibre.

8. Apparatus according to claim 7 in which the means for introducing light comprises means for coupling light from an optical fibre carrying light that has passed along the route to said optical fibre advancing along the route.

9. Apparatus according to claim 8 in which the means for coupling comprises a container of fluid located at the end of the route into which both fibres are arranged to dip.

10. Apparatus according to claim 7 in which the advancing end of the fibre is provided with a lens.

11. Apparatus according to claim 7 in which the means for introducing light comprises an optical source.

12. A method for determining when an advancing end of an optical fibre reaches a predetermined location along a conduit during fibre installation therealong, said method comprising the steps of:
   advancing a distal optical fibre end along an installation route through a conduit;
   introducing an optical signal into the advancing distal optical fibre end at a predetermined location along said installation route and thus propagating said optical signal within said fibre back toward its opposite proximate end; and
   detecting said optical signal at said proximate end as an indication that the advancing fibre end has reached said predetermined location.

13. A method as in claim 12 wherein said introducing and detecting steps are repeated at a plurality of successive predetermined locations along said installation route.

14. A method as in claim 13 wherein a different uniquely characteristic optical signal is used at different ones of said predetermined locations.

15. A method as in claim 12 wherein at least two optical fibres are advanced along said installation route and said introducing step comprises coupling an optical signal from one fibre to the other at their respective distal ends.

16. A method as in claim 15 wherein said at least two optical fibres are advanced simultaneously along said installation route.

17. A method as in claim 12 wherein said introducing step includes use of an optical lens affixed to said distal optical fibre end.

18. A method as in claim 17 wherein said lens includes a hollow central bore and said distal optical fibre end is mechanically affixed within a portion of said bore.

19. Apparatus for determining when an advancing end of an optical fibre reaches a predetermined location along a conduit during fibre installation therealong, said apparatus comprising:
   means for advancing a distal optical fibre end along an installation route through a conduit;
   means for introducing an optical signal into the advancing distal optical fibre end at a predetermined location along said installation route and thus propagating said optical signal within said fibre back toward its opposite proximate end; and
   means for detecting said optical signal at said proximate end as an indication that the advancing fibre end has reached said predetermined location.

20. Apparatus as in claim 19 comprising a plurality of said means for introducing an optical signal at a plurality of successive predetermined locations along said installation route.

21. Apparatus as in claim 20 wherein said means for introducing provides a different uniquely characteristic optical signal at different ones of said predetermined locations.

22. Apparatus as in claim 19 wherein at least two optical fibres are advanced along said installation route and said means for introducing comprises means for coupling an optical signal from one fibre to the other at their respective distal ends.

23. Apparatus as in claim 22 wherein said at least two optical fibres are advanced simultaneously along said installation route.

24. Apparatus as in claim 19 wherein said means for introducing includes an optical lens affixed to said distal optical fibre end.

25. Apparatus as in claim 24 wherein said lens includes a hollow central bore and said distal optical fibre end is mechanically affixed within a portion of said bore.

* * * * *